W. M. BRADSHAW & C. A. BODDIE.
ELECTRICAL MEASURING INSTRUMENT.
APPLICATION FILED JUNE 13, 1917.

1,290,500.

Patented Jan. 7, 1919.

WITNESSES:
William Siler.
J H Procter

INVENTORS
William M. Bradshaw.
Clarence A. Boddie.
BY
Wesley G. Carr
ATTORNEY

UNITED STATES PATENT OFFICE.

WILLIAM M. BRADSHAW, OF WILKINSBURG, AND CLARENCE A. BODDIE, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,290,500.              Specification of Letters Patent.     Patented Jan. 7, 1919.

Application filed June 13, 1917.   Serial No. 174,451.

*To all whom it may concern:*

Be it known that we, WILLIAM M. BRADSHAW, a citizen of the United States, and a resident of Wilkinsburg, in the county of Allegheny and State of Pennsylvania, and CLARENCE A. BODDIE, a citizen of the United States, and a resident of Pittsburgh, in the county of Allegheny and State of Pennsylvania, have invented a new and useful Improvement in Electrical Measuring Instruments, of which the following is a specification.

Our invention relates to electrical measuring instruments and particularly to motor-meters.

One object of our invention is to provide means for adapting a motor-meter to operate correctly on a wide range of applied voltage.

Another object of our invention is to provide the magnetic circuit of a motor-meter with means for deflecting a relatively large part of its main magnetic flux through its armature at predetermined times.

Heretofore, performances of twenty-five cycle watthour meters of the induction type have been found to be, in some degree, unsatisfactory in that the voltage curves taken thereon did not approach a straight line of constant value, and the load curves for various voltages were relatively different in value. Therefore, when the applied voltage varied from the voltage for which the instrument was calibrated, the registration at different loads was incorrect.

In our invention, we provide means for deflecting a relatively large part of the flux induced by the voltage winding through the armature when predetermined voltages are impressed thereon in order to increase the torque of the armature and overcome the damping effect on the armature at relatively high voltages.

Figure 1:
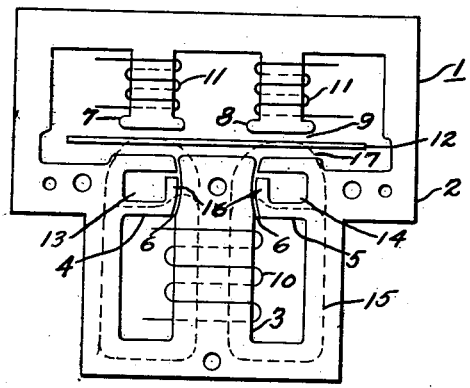
Figure 2:
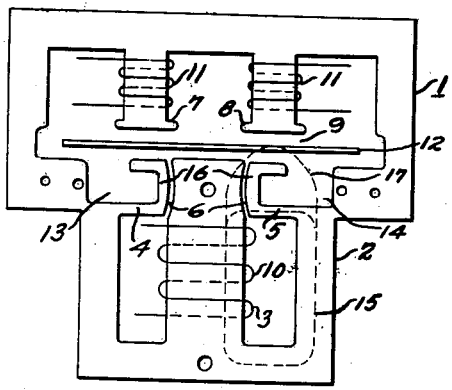
Figure 3:
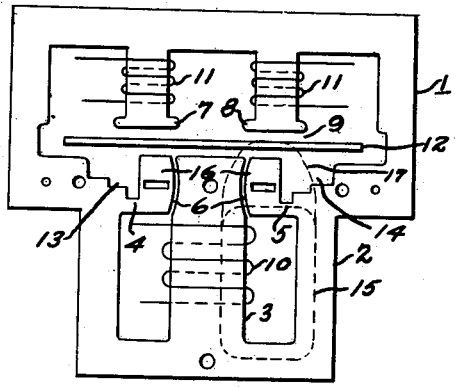
Figure 4:
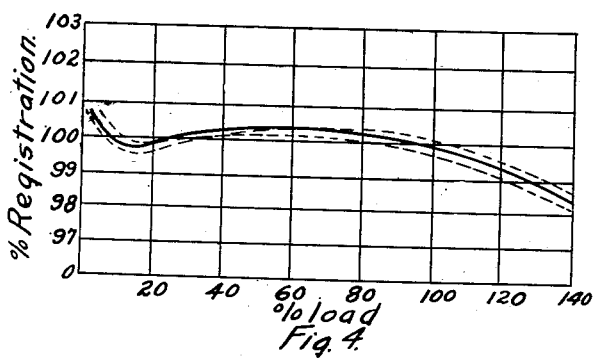
Figure 5:
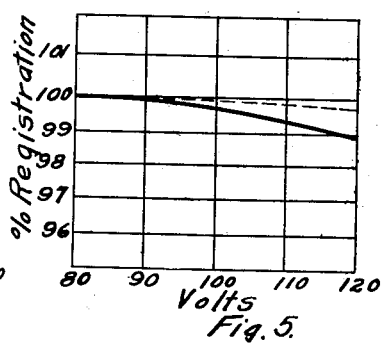

In the accompanying drawings, Figure 1 is an elevational view of the magnetizable members of a watthour meter embodying our invention; Figs. 2 and 3 are elevational views of modified forms of magnetizable members embodying our invention, and Figs. 4 and 5 are curves illustrating the results obtained with our invention.

The measuring instrument 1 comprises a laminated closed-magnetic-circuit member 2 having a central leg or member 3, two side members 4 and 5 that are spaced from the central leg 3 at one end by air gaps 6 and downwardly extending members 7 and 8 that are spaced from the central member 3 and side members 4 and 5 by an air gap 9. A potential winding 10 surrounds the central member 3 and current windings 11 are disposed around the members 7 and 8. An armature 12 is disposed in the air gap 9 and is adapted to be rotated by a shifting field therein, as is understood by those versed in the art.

The side members 4 and 5 are provided with openings 13 and 14, respectively, preferably intermediate their ends, for the purpose of so reducing the cross sectional area of the side members that they become magnetically saturated under predetermined conditions of applied voltage. That is, the side members 4 and 5 are of such shape that they permit the correct distribution of the magnetic flux through the air gaps 6, under normal voltage conditions.

The dotted lines 15 that pass through the air gaps 6 indicate the normal paths of the magnetic flux that is induced by the potential winding 10. A relatively large part of the flux will tend to crowd through the portions 16 of the side members 4 and 5, under normal voltage conditions, since this is the path of least reluctance. However, if the load is kept constant on the instrument, when the voltage impressed upon the potential winding increases to such value that the side members 4 and 5 become magnetically saturated because of the increase in flux, the reluctance of the path 15 through the air gaps 6 will increase and a relatively large part of the flux will traverse a parallel path 17 of relatively less reluctance. Thus, the flux will fringe out into the air gap 9 in greater proportion than the increase in voltage, to thereby intercept the armature 12 and thus increase its torque.

If the potential impressed upon the potential winding of an ordinary alternating-current induction motor-meter increases, the speed will decrease because the driving torque increases in accordance with the increase in potential while the retarding torque, that is produced by the potential flux, increases in accordance with the square of the increase in potential. This is seen in the solid-line curve in Fig. 5 which represents the per cent. registration of the wattmeter at varying voltages and constant load when the members 4 and 5 are not adapted to become magnetically saturated.

If the driving torque that is produced by the potential flux is relatively large with respect to the retarding torque produced thereby and can be caused to increase at a greater rate than the increase in potential, as is the case in our device, the increase in the retarding torque may be overcome and a per cent. registration curve, substantially as shown by the broken lines in Fig. 5, may be obtained. Therefore, if the members 4 and 5 are so proportioned that they become magnetically saturated above predetermined voltages impressed upon the winding 10, relatively more flux will intercept the armature 12, and the resultant torque and, consequently, the speed may be caused to be substantially constant for any value of voltage above the predetermined value. The value of voltage at which magnetic saturation is reached in the members 4 and 5 may be increased by decreasing the size of the openings 13 and 14 intermediate the ends of the members 4 and 5.

Since it has been shown that the voltage curve at full load may be made a substantially straight line of constant value, it may be shown that, for various loads, the voltage curves may be caused to have substantially the same value. The curve shown in Fig. 4 of the drawings represents the per cent. registration for three different voltages as 90, 110 and 130 volts for different loads. The difference in value of these curves is a very small percentage of their total value, and, for commercial devices, may be considered to be the same, Since it is shown, with respect to Fig. 5 of the drawings, that, should the members 4 and 5 not become magnetically saturated under operating conditions, the per cent. registration would decrease as the value of the voltage increases.

Although the constructions, as illustrated, have been found highly effective, it is obvious that many modifications may be made therein within the spirit and scope of the invention, and we desire to include all such modifications within the scope of the appended claims.

We claim as our invention:

1. An electrical measuring instrument comprising a magnetizable core having a central member and side members integral therewith at one end and spaced from each other at one end by air gaps and downwardly projecting members spaced from the said central and side members by an air gap, said side members having such portions thereof cut away intermediate their ends that a part of the flux that traverses the central and side members is deflected to the air gap between the downwardly projecting members and the central member under predetermined voltage conditions.

2. An electrical measuring instrument comprising a magnetizable core having an integral central member and side members spaced from each other at one end by air gaps and downwardly extending members spaced from the central and side members by said air gap, said side members having openings therein for causing the flux that traverses the central and side members to be deflected into the air gaps between the downwardly extending and the central member under predetermined voltage conditions.

3. An electrical measuring instrument comprising a magnetizable core having a central upwardly projecting member, side members integral with the core and separated from the central member by air gaps and downwardly projecting members separated from the central and side members by air gaps, said side members having such openings therein that they become magnetically saturated under predetermined voltage conditions.

4. An electrical measuring instrument comprising a magnetizable core member of substantially the form of a hollow rectangle having a single pole extending inwardly from one of its sides, two poles extending inwardly from the opposite side and separated from the single pole by air gaps and a pole integral with the core extending inwardly from each of the other sides and separated from the single pole by air gaps and having such portions thereof cut away that it is adapted to become magnetically saturated under predetermined voltage conditions.

5. An electrical measuring instrument comprising a laminated magnetizable core having a central member and side members spaced from each other at one end by air gaps and integral with each other at their other ends, said side members having such opening therein intermediate their ends that the reluctance of the path through the air gaps between the members is increased under predetermined voltage conditions.

6. An electrical measuring instrument comprising a laminated magnetizable core having an integral central member, downwardly extending members and side members spaced from the central member and each other at one end by air gaps, said side members having such openings therein that the reluctance of the path through the air gaps between the central and side members is increased at predetermined times.

7. A motor-meter comprising a core member having a closed-magnetic-circuit outer portion, inwardly extending portions integral with the outer portion at one end and separated from each other at their other ends by air gaps, said inwardly extending portions having such portions thereof cut away intermediate their ends that they become magnetically saturated under predetermined voltage conditions.

8. A motor-meter comprising a closed-magnetic-circuit outer portion, a central portion, downwardly extending portions and side portions separated from each other at one end by air gaps and integral with the outer portion at their other ends, said side members having openings therein intermediate their ends for causing the same to become magnetically saturated under predetermined voltage conditions.

In testimony whereof, we have hereunto subscribed our names this 22nd day of May, 1917.

WILLIAM M. BRADSHAW.
CLARENCE A. BODDIE.